(12) United States Patent
Stephens et al.

(10) Patent No.: US 11,635,349 B1
(45) Date of Patent: Apr. 25, 2023

(54) VALVE TESTING APPARATUS

(71) Applicant: Honda Motor Co., Ltd., Tokyo (JP)

(72) Inventors: Kaleb Stephens, Cross Plains, TN (US); John Michael Scelsi, Pell City, AL (US)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 17/538,884

(22) Filed: Nov. 30, 2021

(51) Int. Cl.
    *G01M 15/04*     (2006.01)

(52) U.S. Cl.
    CPC .................................. *G01M 15/04* (2013.01)

(58) Field of Classification Search
    CPC .................................................... G01M 15/04
    See application file for complete search history.

(56) References Cited

U.S. PATENT DOCUMENTS

| | | | | |
|---|---|---|---|---|
| 3,638,486 | A | * | 2/1972 | Lambert .................. G01N 3/00 73/161 |
| 3,640,129 | A | * | 2/1972 | Bandimere .............. G01N 3/00 73/161 |
| 4,143,583 | A | | 3/1979 | Bauer et al. |
| 4,641,521 | A | * | 2/1987 | Lawrence ........... G01M 13/003 73/161 |
| 5,339,515 | A | * | 8/1994 | Brackett ................. B25B 27/26 29/888.42 |
| 5,417,109 | A | * | 5/1995 | Scourtes ............. G01M 15/042 73/114.16 |
| 6,098,446 | A | * | 8/2000 | Buxton ..................... F01L 1/46 73/1.72 |
| 6,215,310 | B1 | * | 4/2001 | Petrovich ............... F02P 17/00 324/378 |
| 7,424,872 | B2 | | 9/2008 | Fuwa et al. |
| 7,634,981 | B2 | | 12/2009 | Dea et al. |
| 8,573,241 | B2 | | 11/2013 | Esposito |
| 8,631,688 | B1 | | 1/2014 | Rayl et al. |
| 9,410,874 | B2 | | 8/2016 | He et al. |
| 10,513,971 | B2 | | 12/2019 | Iijima et al. |
| 10,564,062 | B2 | | 2/2020 | Karg et al. |

(Continued)

FOREIGN PATENT DOCUMENTS

| CN | 102444738 B | 5/2014 |
|---|---|---|
| DE | 19854205 A1 | 5/2000 |

(Continued)

*Primary Examiner* — Eric S. McCall
(74) *Attorney, Agent, or Firm* — Suzanne Gagnon; American Honda Motor Co., Inc.

(57) ABSTRACT

An apparatus is provided to test valves. The apparatus includes a base and an actuation mechanism with an actuator having a first end coupled to the base and a second end retractably extends from the base. The apparatus further includes a common platform with a first surface and a second surface. The first surface coupled to the second end of the actuator and moves from the base, based on an extension of the actuator. The apparatus further includes a plurality of engagement members each of which includes a first portion coupled to the first surface and a second portion coupled to the second surface. The apparatus further includes a plurality of sensors coupled to the plurality of engagement members such that each sensor of the plurality of sensors is coupled to corresponding member of the plurality of engagement members and coupled with a valve associated with a machine.

20 Claims, 10 Drawing Sheets

(56) References Cited

U.S. PATENT DOCUMENTS

| | | | |
|---|---|---|---|
| 10,866,581 B2 | 12/2020 | Priisholm et al. | |
| 10,947,699 B2 | 3/2021 | Saitoh et al. | |
| 2005/0126524 A1* | 6/2005 | Funke | F01L 9/10 |
| | | | 73/114.11 |
| 2015/0276551 A1* | 10/2015 | Sueoka | G01M 15/106 |
| | | | 73/114.37 |
| 2022/0395940 A1* | 12/2022 | Stephens | G05B 19/41805 |
| 2022/0397485 A1* | 12/2022 | Stephens | G01M 15/042 |
| 2022/0398875 A1* | 12/2022 | Stephens | G01M 15/042 |

FOREIGN PATENT DOCUMENTS

| | | |
|---|---|---|
| EP | 1069298 B1 | 5/2004 |
| JP | 2707740 B2 | 2/1998 |

* cited by examiner

VALVE TESTING APPARATUS

BACKGROUND

Valves may be generally used to control a fluid flow (such as an airflow, a gasoline flow, or a combination of both) in a machine (such as an engine). Valves may releasably couple with ports (such as inlet and outlet ports) of the machine and configured to control the fluid flow in the machine. In certain cases, there may be an abnormality (such as an interference between the valves and the ports, or a leakage between the valves and the ports) during installation of the valves. Such abnormality during installation of the valves may lead to improper valve actuations and may subsequently affect performance of the machine. Therefore, during the installation of the valves, it may be necessary to test an assembly between the valves and the ports of the machine.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides an apparatus. The apparatus may include a base and an actuation mechanism which may include an actuator having a first end and a second end. The first end may be coupled to the base and the second end may be configured to retractably extend from the base. The apparatus may further include a common platform which may include a first surface and a second surface. The first surface may be coupled to the second end of the actuator and configured to move from the base, based on an extension of the actuator. The apparatus may further include a plurality of engagement members each of which may include a first portion and a second portion. The first portion of each of the plurality of engagement members may be coupled to the first surface of the common platform and the second portion of each of the plurality of engagement members may be coupled to the second surface of the common platform. The apparatus may further include a plurality of sensors coupled to the plurality of engagement members such that each sensor of the plurality of sensors may be coupled to corresponding member of the plurality of engagement members. Each sensor of the plurality of sensors may be configured to be coupled with a valve of a valve train.

Another exemplary aspect of the disclosure provides an apparatus. The apparatus may include an actuation mechanism which may include an actuator. The apparatus may further include a common platform coupled to the actuator. The apparatus may further include a plurality of engagement members coupled to the common platform. The apparatus may further include a plurality of sensors coupled to the plurality of engagement members such that each sensor of the plurality of sensors may be coupled to corresponding member of the plurality of engagement members and aligned with a valve of a plurality of valves associated with a machine. The apparatus may further include a control system coupled to the plurality of sensors. The control system may be configured to actuate the actuation mechanism to control the actuator to move at least a part of the common platform, which may cause a movement of at least one of the plurality of engagement members. The movement may facilitate an activation of each valve of the plurality of valves. The control system may be further configured to control each sensor of the plurality of sensors to acquire information associated with the activation of each valve of the plurality of valves. The control system may be further configured to compare the acquired information with pre-stored information, to identify an abnormality in each valve of the plurality of valves. The control system may be further configured to generate a notification based on the comparison.

Another exemplary aspect of the disclosure provides a method to test valves. The method may include disposing an apparatus which includes: an actuation mechanism which includes an actuator, a common platform coupled to the actuator, a plurality of engagement members coupled to the common platform, and a plurality of sensors coupled to the plurality of engagement members such that each sensor of the plurality of sensors is coupled to corresponding member of the plurality of engagement members. The method may further include aligning each sensor of the plurality of sensors with a valve of a plurality of valves associated with a machine. The method may further include actuating the actuation mechanism to control the actuator to move at least a part of the common platform, which may cause a movement of at least one of the plurality of engagement members. The movement may facilitate an activation of each valve of the plurality of valves. The method may further include controlling each sensor of the plurality of sensors to acquire information associated with the activation of each valve of the plurality of valves. The method may further include comparing the acquired information with pre-stored information, to identify an abnormality in each valve of the plurality of valves. The method may further include generating a notification based on the comparison.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
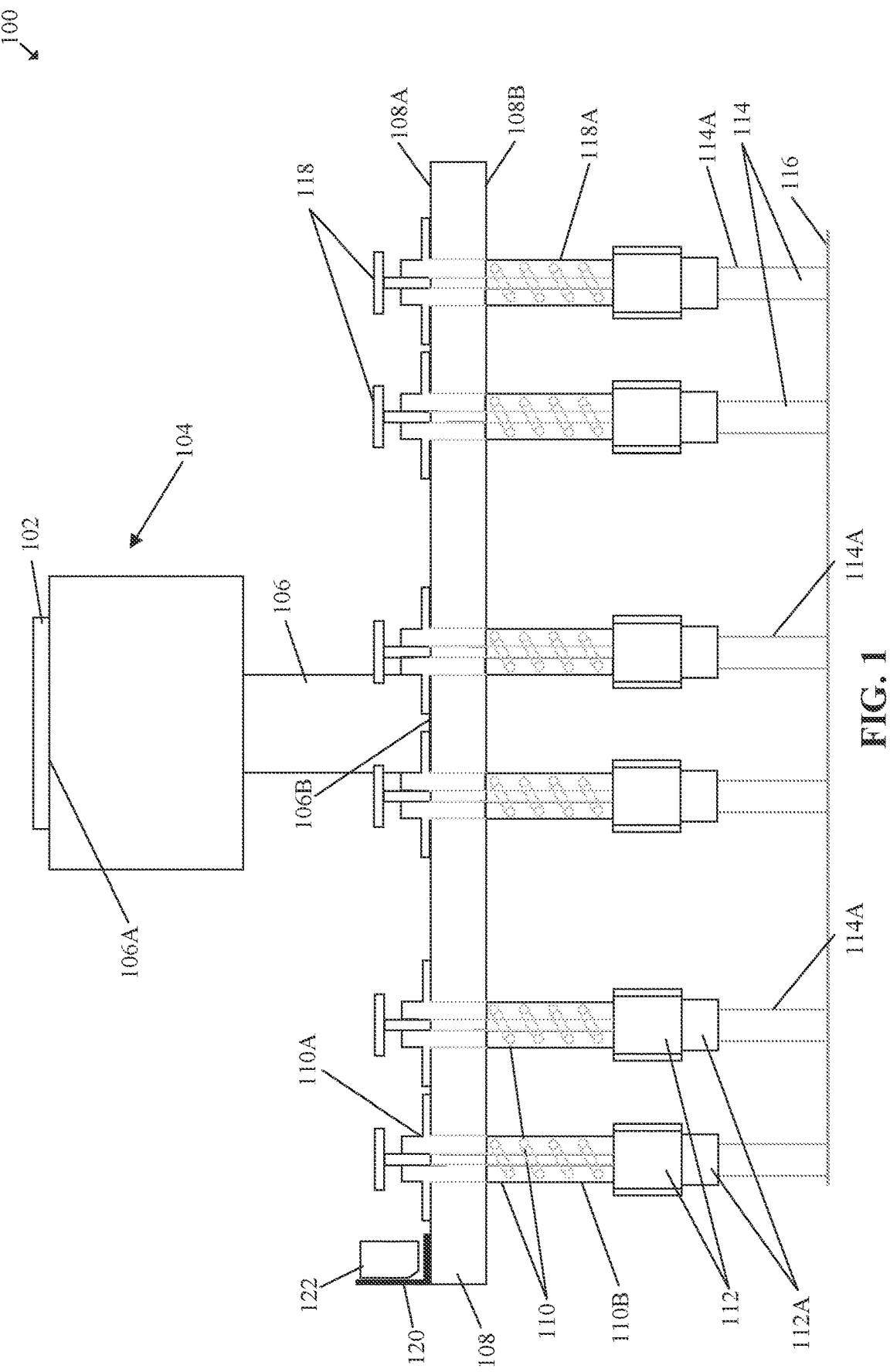
FIG. 1 is a diagram that illustrates an exemplary apparatus for valve testing, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may provide an apparatus, for example, an apparatus to test an assembly of valves of a machine (such as an engine head). The apparatus may include a base, an actuation mechanism with an actuator (such as a servomotor) coupled to the base, a common platform coupled to the actuator, a plurality of engagement members (such as followers) coupled to the common platform, and a plurality of sensors (such as force sensors) coupled to the plurality of engagement members such that each sensor of the plurality of sensors is coupled to corresponding member of the plurality of engagement members. Each sensor of the plurality of sensors may be configured to be coupled with a valve of a plurality of valves (such as a valve train) associated with the machine. Therefore, during the installation of the valves, each valve may be tested for an abnormality (such as an interference between the valves and ports, or a leakage between the valves and ports) in an assembly between the valves and ports of the machine. Further, as all the valves are actuated at a time, there may be an improvement on a cycle time (such as a reduction in time that may have incurred to activate the valves and test the assembly between the valves and ports of the machine). Details of the activation of the valves are further described, for example, in FIGS. 2A-2C.

The apparatus may further include a control system that may be coupled to the plurality of sensors. The control system may actuate the actuation mechanism to control the actuator to move at least a part of the common platform, which may cause a movement of at least one of the plurality of engagement members. The movement may facilitate an activation of each valve of the plurality of valves associated with the machine. The control system may further control each sensor of the plurality of sensors to acquire information (such as a force value and/or a position of the actuator from the base) associated with the activation of each valve of the plurality of valves. The control system may further compare the acquired information with pre-stored information (such as a pre-stored force value and/or a pre-stored distance associated with a position of the actuator from the base), to precisely identify the abnormality (such as an interference between the valves and ports, or a leakage between the valves and ports) in each valve of the plurality of valves. The control system may further generate a notification based on the comparison. Hence, such precise identification of the abnormality may improve a quality of installation of the valves on the ports of the machine. Details of such configuration of the precise identification of the abnormality are further described, for example, in FIGS. 4A-4B.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a diagram that illustrates an exemplary apparatus for valve testing, in accordance with an embodiment of the disclosure. With reference to FIG. 1, there is shown an exemplary view of an apparatus 100. The apparatus 100 may include a base 102, an actuation mechanism 104 with an actuator 106 coupled to the base 102, a common platform 108 coupled to the actuator 106, a plurality of engagement members 110 coupled the common platform 108, and a plurality of sensors 112 coupled to the plurality of engagement members 110 members such that each sensor of the plurality of sensors 112 is coupled to corresponding member of the plurality of engagement members 110 (as shown in FIG. 1). Each sensor of the plurality of sensors 112 is configured to be coupled with a valve 114A of a valve train 114 associated with an engine head 116. to test the valve train 114 for an abnormality (such as an interference between the valves and the ports, or a leakage between the valves and the ports) during installation of valves of the valve train 114 in the engine head 116.

The apparatus 100 may be configured to test the abnormality in each of the valve 114A of the valve train 114. For example, the apparatus 100 may be configured to translate at least one member of the plurality of engagement members 110 coupled with valves (such as the valve 114A) of the valve train 114, to test the valves of the valve train 114. In an embodiment, the apparatus 100 may be configured to selectively test the abnormality in each valve of the valve train 114. For example, the apparatus 100 may be configured to selectively translate each member of the plurality of engagement members 110 coupled with the valve train 114, to selectively activate corresponding valve of the valve train 114. Based on the selective activation of the valves of the valve train 114, the abnormality associated with each valve of the valve train 114 may be tested. Details of the selective activation of the valve train 114 are further described, for example, in FIG. 5 and FIG. 6.

In another embodiment, the apparatus 100 may be configured to test the abnormality in all valves of the valve train 114. For example, the apparatus 100 may be configured to translate all members of the plurality of engagement members 110 coupled with the valve train 114, at a single instance, to activate all the valves of the valve train 114. Based on the activation of the valves of the valve train 114, the abnormality associated with each valve of the valve train 114 may be tested. Details of the activation of all the valves of the valve train 114 are further described, for example, in FIGS. 2A-2C.

In an embodiment, the apparatus 100 may be coupled to a part of an assembly line of a manufacturing unit, to test the abnormality in each valve of the valve train 114. For example, the base 102 of the apparatus 100 may be coupled to the part (such as a ceiling portion or a floor portion) of the assembly line and other components of the apparatus 100 may be suspended on the base 102, to test the abnormality in each valve of the valve train 114.

The base 102 of the apparatus 100 may be configured to hold and support other components (such as the actuator 106, the common platform 108, the plurality of engagement members 110, and the plurality of sensors 112) of the apparatus 100. For example, the base 102 may include a suitable coupling element (such as a mechanical fastener), which may be coupled to the actuator 106 that may support other components of the apparatus 100. In another embodiment, the base 102 may have a substantially rectangular surface to support other components of the apparatus 100. Such substantially rectangular surface may facilitate an improved space to accommodate other components of the apparatus 100. Further, such substantially rectangular surface may also enhance the stability of the apparatus 100. In other embodiments, the base 102 may also have any structure other than the substantially rectangular surface, which may include, but not limited to, a substantially square surface, a substantially circular surface or a substantially polygonal surface, etc. In an embodiment, the suitable coupling element of the base 102 may also have an electrical provision (such as an electric switch) that may be coupled with the actuator 106 of the actuation mechanism 104.

The actuation mechanism 104 may include suitable logic, control system, and interfaces that may be configured to control the actuator 106. In an example, the actuation mechanism 104 may be configured to retractably extend the actuator 106 from the base 102. Based on an extension of the actuator 106, the common platform 108 coupled to the base 102 move along with the plurality of engagement members 110 to control the activation of each valve of the valve train 114 associated with the engine head 116. In another example, the actuation mechanism 104 may be configured to retractably extend the actuator 106 to directly control the activation of each valve of the valve train 114 associated with the engine head 116. In an embodiment, the actuation mechanism 104 may be configured to control at least one of: a position (such as a change in position due to a linear movement) of the actuator 106, a velocity (such as a linear velocity) of the actuator 106, or an acceleration (such as a linear acceleration) of the actuator 106, based on user requirements.

The actuator 106 may include suitable logic, control system, and interfaces that may be associated with the actuation mechanism 104 and configured to be translated from the base 102 of the apparatus 100. The actuator 106 may include a first end 106A and a second end 106B. The first end 106A may be coupled to the base 102 and the second end 106B is configured to retractably extend from the base 102. In an example, as shown in FIG. 1, the first end 106A of the actuator 106 may be substantially opposite to the second end 106B of the actuator 106. In an embodiment, the actuator 106 may include one of: an electric actuator, a hydraulic actuator, or a pneumatic actuator. For example, the actuator 106 may include a servomotor that may be activated to control the movement of the actuator 106 from the base 102. The servomotor may be a linear actuator, which may be configured to precisely control the position (such as the change in position due to the linear movement) of the actuator 106, the velocity (such as the linear velocity) of the actuator 106, or the acceleration (such as the linear acceleration) of the actuator 106, based on the activation of the servomotor. The servomotor is merely an example of the actuator 106. The actuation mechanism 104 may include any other actuation units to control the movement of the actuator 106. Examples of such actuation units may include, but are not limited to, electrical actuators (such as, a stepper motor, or an induction motor, an AC motor, or a DC motor), hydraulic actuators (such as a hydraulic cylinder), or pneumatic actuators (such as a pneumatic cylinder), which may be configured to control the movement of the actuator 106. In an embodiment, the actuator 106 may be integrally coupled to the common platform 108 to control the movement of the common platform 108. In another embodiment, the actuator 106 may be remotely coupled to the common platform 108, via a coupler, to control the movement of the common platform 108.

The common platform 108 may be coupled to the actuator 106 and configured to accommodate the plurality of engagement members 110. For example, the common platform 108 may include a plurality of holes (not shown) to fixedly engage with the plurality of engagement members 110. Based on the fixed engagement of the plurality of engagement members 110, when the actuator 106 is moved, the common platform 108 may move from the base 102, along with the plurality of engagement members 110. In an embodiment, the common platform 108 may include a first surface 108A and a second surface 108B. The first surface 108A may be coupled to the second end 106B of the actuator 106 and configured to move from the base 102, based on the extension of the actuator 106. In an example, as shown in FIG. 1, the first surface 108A of the common platform 108 may be substantially opposite to the second surface 108B of the common platform 108. In an embodiment, the common platform 108 may be configured to be disposed substantially perpendicular to the actuator 106. In another embodiment, the common platform 108 may also have a support structure 120 disposed substantially parallel to the actuator 106.

The common platform 108 may have a substantially rectangular surface to support each member of the plurality of engagement members 110, as shown in FIG. 1. Such substantially rectangular surface may facilitate an improved space to easily accommodate each member of the plurality of engagement members 110. Further, such substantially rectangular surface may also enhance the stability of the apparatus 100. In other embodiments, the common platform 108 may also have any structure other than the substantially rectangular surface, which may include, but not limited to, a substantially square surface, a substantially circular surface or a substantially polygonal surface, etc., to easily accommodate each member of the plurality of engagement members 110.

The plurality of engagement members 110 may be configured to receive a linear force from the common platform 108 and transmit the received linear force from each member of the plurality of engagement members 110, via each sensor of the plurality of sensors 112, on each valve of the valve train 114. The transmission of the linear force may activate each valve of the valve train 114. For example, a member of the plurality of engagement members 110 may receive the linear force from the common platform 108 and transmit the received linear force from the member of the plurality of engagement members 110, via corresponding sensor of the plurality of sensors 112, on corresponding valve (such as the valve 114A) of the valve train 114, such that, the transmission of the linear force may activate the corresponding valve of the valve train 114.

In an embodiment, each member of the plurality of engagement members 110 may include a first portion 110A and a second portion 110B. The first portion 110A of each of the plurality of engagement members 110 may be coupled to the first surface 108A of the common platform 108 and the second portion 110B of each of the plurality of engagement members 110 may be coupled to the second surface 108B of the common platform 108 (as shown, for example, in FIG. 1). In an example, the first portion 110A of each of the plurality of engagement members 110 may have a flange-shaped structure. The flange-shaped structure may have an additional diameter that may be more than a diameter of the plurality of holes of the common platform 108. Based on the additional diameter of the flange-shaped structure of the first portion 110A, the first portion 110A of each of the plurality of engagement members 110 may be held in the first surface 108A of the common platform 108 as shown, for example, in FIG. 1.

In an embodiment, each member of the plurality of engagement members 110 may be coupled substantially perpendicular to the common platform 108 and extend from the first surface 108A to the second surface 108B of the common platform 108. In another embodiment, each member of the plurality of engagement members 110 may be coupled to the common platform 108 at an angular arrangement (such as between 45 degrees to 135 degrees) and extend from the first surface 108A to the second surface 108B of the common platform 108. Based on such angular arrangement, it may be easier for each member of the plurality of engagement members 110 to reach corresponding valve of the valve train 114, and thereby facilitating an improved connection between each member of the plurality of engagement members 110 and the corresponding valve of the valve train 114. In another embodiment, the plurality of engagement members 110 may have a substantially cylindrical profile, which may facilitate a minimal wear during a translation of other components (such as biasing members) in each member of the plurality of engagement members 110. In another embodiment, the plurality of engagement members 110 may also form a splined connection (not shown) with the common platform 108, so that, the plurality of engagement members 110 may be constrained. For example, the plurality of engagement members 110 may include a protruded splined profile and the plurality of holes may include a concave splined profile. When the protruded splined profile of each member of the plurality of engagement members 110 is coupled to the concave splined profile of each hole of the plurality of holes of the common platform 108, there may be formation of a rigid connection. Based on the rigid connection, the plurality of engagement members 110 may be moved along with the plurality of sensors 112 without any wobbling between the first surface 108A and the second surface 108B of the common platform 108.

The plurality of sensors 112 may include suitable logic, control system, and interfaces that may be configured to detect at least one of: linear forces, rotational forces, or torsional forces, of each member of the plurality of engagement members 110 on the corresponding valve of the valve train 114. The plurality of sensors 112 may be coupled to the plurality of engagement members 110 such that each sensor of the plurality of sensors 112 may be coupled to corresponding member of the plurality of engagement members 110. In an embodiment, each sensor of the plurality of sensors may be configured to be coupled with the valve 114A of the valve train 114 associated with an engine head 116. For example, each sensor of the plurality of sensors 112 may include a detection element (not shown) that may be coupled with the valve 114A of the valve train 114.

Each sensor of the plurality of sensors 112 may be configured to detect at least one of: the linear forces, the rotational forces, or the torsional forces of corresponding member of the plurality of engagement members 110 on the corresponding valve of the valve train 114, based on the movement (such as the extension) of the actuator 106. In an embodiment, the plurality of sensors 112 may convert the detected forces (such as the linear forces, the rotational forces, or the torsional forces) to electrical signals and may transmit such electrical signals to the apparatus 100. The apparatus 100 may determine information associated with the force of the actuator 106 based on the electrical signals that may be received from the plurality of sensors 112. The determined information may be used to determine additional information associated with lubrication in the valve train 114, a fit (such as an interference fit and/or an alignment) of the valves in corresponding valve guide of the valve train 114. Examples of the plurality of sensors 112 may include, but not limited to, a load cell, a strain gauge, a torque sensor, a force sensor, a force-torque (FT) sensor, a piezoelectric transducer, a rotary torque transducer, a reaction torque transducer, or a Force Sensing Resistor (FSR), etc.

In an embodiment, each sensor of the plurality of sensors 112 may be configured to be coupled with corresponding valve of the valve train 114, via a cushion 112A (shown in FIG. 1) coupled to each sensor of the plurality of sensors 112. The cushion 112A may be a push pad that may be coupled to each sensor of the plurality of sensors 112, so that, each sensor of the plurality of sensors 112 may be protected during the engagement with corresponding valve of the valve train 114. Based on the movement of the actuator 106 and the subsequent movement of the common platform 108 and the plurality of engagement members 110, each valve of the valve train 114 may be activated. Based on the activation of each valve of the valve train 114, corresponding sensor of the plurality of sensors 112 may be configured to acquire information associated with corresponding valve of the valve train 114.

The valve train 114 may be configured to control a plurality of ports (such as an inlet port, or an exhaust port) of the engine head 116. For example, each cylinder of the engine head 116 may include the inlet port and the exhaust port, which may be releasably closed by a plurality of valves (such as the valve 114A) of the valve train 114. In an embodiment, the valve train 114 may be disposed on a top surface of the engine head 116 and configured to releasably close each port of the plurality of ports of the engine head 116. In an embodiment, each valve (such as the valve 114A) of the valve train 114 may be activated based on the extension of the actuator 106. For example, each valve of the valve train 114 may be activated based on the extension of the actuator 106 and the subsequent movement of the common platform 108 and the plurality of engagement members 110. In another embodiment, each valve (such as the valve 114A) of the valve train 114 may be directly activated (such as, via a solenoid mechanism) by the apparatus 100, without a need for the extension of the actuator 106. For example, each valve of the valve train 114 may be directly activated from an electronic actuation of a solenoid actuator that may be coupled to the second end 106B of the actuator 106 to actuate corresponding valve (such as the valve 114A) of the valve train 114.

The valve 114A may be configured to releasably control a port (not shown) of the engine head 116. In one example, the valve 114A may control the inlet port of the engine head 116. In another example, the valve 114A may control the outlet port of the engine head 116. In an embodiment, the valve 114A may be a poppet valve and configured to be biased by a valve spring (not shown) and further disposed in a valve guide (not shown) coupled to at least one port (such as the inlet port or the outlet port) of the engine head 116. Other examples of the valve 114A may include, but are not limited to, a sleeve valve, a slide valve, a rotary valve, etc.

In an embodiment, the valve 114A may further include a valve seat, a valve stem, and a valve tip (not shown). The valve seat of the valve 114A may be configured to releasably close at least one port (such as the inlet port or the outlet port) of the engine head 116. The valve stem of the valve 114A may be slidably disposed on the valve guide and the valve tip of the valve 114A may protrude from the valve guide. In an embodiment, the valve tip of the valve 114A may be configured to be coupled with the cushion 112A of corresponding sensor of the plurality of sensors 112 attached to corresponding member of the plurality of engagement members 110. Based on the extension of the actuator 106 and the subsequent movement of the common platform 108 and the plurality of engagement members 110, each valve (such as the valve 114A) of the valve train 114 may be activated, to test corresponding valve (such as the valve 114A) of the valve train 114 associated with the engine head 116.

The engine head 116 may be configured to hold a plurality of valves (such as the valve 114A) of the valve train 114, a plurality of spark plugs (not shown), a plurality of fuel injectors (not shown), etc. In an embodiment, based on an arrangement of the plurality of ports and corresponding valves of the valve train 114, the engine head 116 may have a plurality of configurations. For example, in one implementation, the engine head 116 may have a loop-flow configuration (i.e., the plurality of ports and the valve train 114 are disposed in a single side on the engine head 116), an inline cross flow configuration (i.e., the plurality of ports and the valve train 114 are disposed in on opposing sides on the engine head 116), or an offset cross-flow configuration (i.e., the inlet port and the exhaust port of each cylinder portion of the engine head 116 may be disposed on opposing sides and offset from each other, when such ports and the valve train 114 are located on the engine head 116).

In an embodiment, the plurality of engagement members 110 may further include a plurality of trip dogs 118. For example, each trip dog of the plurality of trip dogs 118 may be configured to be concentrically disposed in corresponding member of the plurality of engagement members 110. In an embodiment, each trip dog of the plurality of trip dogs 118 may be biased by a heavy spring 118A (such as a compression spring, an extension spring, or a torsion spring) that is disposed inside each member of the plurality of engagement members 110 (as shown, for example, in FIG. 1). Based on the bias of the heavy spring 118A, each trip dog of the plurality of trip dogs 118 may be retractably extend from the first surface 108A of the common platform 108 towards the base 102 of the apparatus 100, based on an interruption in the activation of corresponding valve of the valve train 114. Details of such interruption in the activation of the valve train 114 is described in detail, for example, in FIG. 4A and FIG. 4B.

In another embodiment, the common platform 108 may further include a support structure 120 and a trip dog sensor 122 coupled to the support structure 120 (as shown, for example, in FIG. 1). The support structure 120 may be disposed at a portion of the first surface 108A of the common platform 108 and configured to enclose the trip dog sensor 122. The trip dog sensor 122 may be configured to detect an extension of each trip dog of the plurality of trip dogs from the first surface 108A of the common platform 108 towards the base 102.

The support structure 120 may be configured to substantially enclose the trip dog sensor 122 of the apparatus 100. For example, support structure 120 may be coupled substantially perpendicular to the common platform 108 and enclose the trip dog sensor 122 of the apparatus 100. In an embodiment, the support structure 120 may be disposed substantially perpendicular on ends of the common platform, to hold the components (such as the trip dog sensor 122) of the apparatus 100. In an embodiment, the support structure 120 may have a substantially rectangular structure. Such substantially rectangular structure may further improve the stability in detection of objects (such as the movement of the plurality of trip dogs 118) via the trip dog sensor 122. In other embodiments, the support structure 120 may also have any structure other than the substantially rectangular structure, which may include, but is not limited to, a substantially curved structure, or a substantially polygonal structure, etc.

The trip dog sensor 122 may include suitable logic, control system, and interfaces that may be configured to detect the extension of each trip dog of the plurality of trip dogs 118 based on the interruption in the activation of corresponding valve of the valve train 114. The trip dog sensor 122 may be located substantially perpendicular to the common platform 108 and coupled substantially parallel to the support structure 120. Examples of the trip dog sensor 122 may include, but are not limited to, an optical proximity sensor, a magnetic proximity sensor, an inductive proximity sensor (such as a hall sensor), a capacitive proximity sensor, or an acoustical proximity sensor, a tactile sensor (such as a touch probe), or a Linear Variable Differential Transformer (LVDT).

Figure 2A:
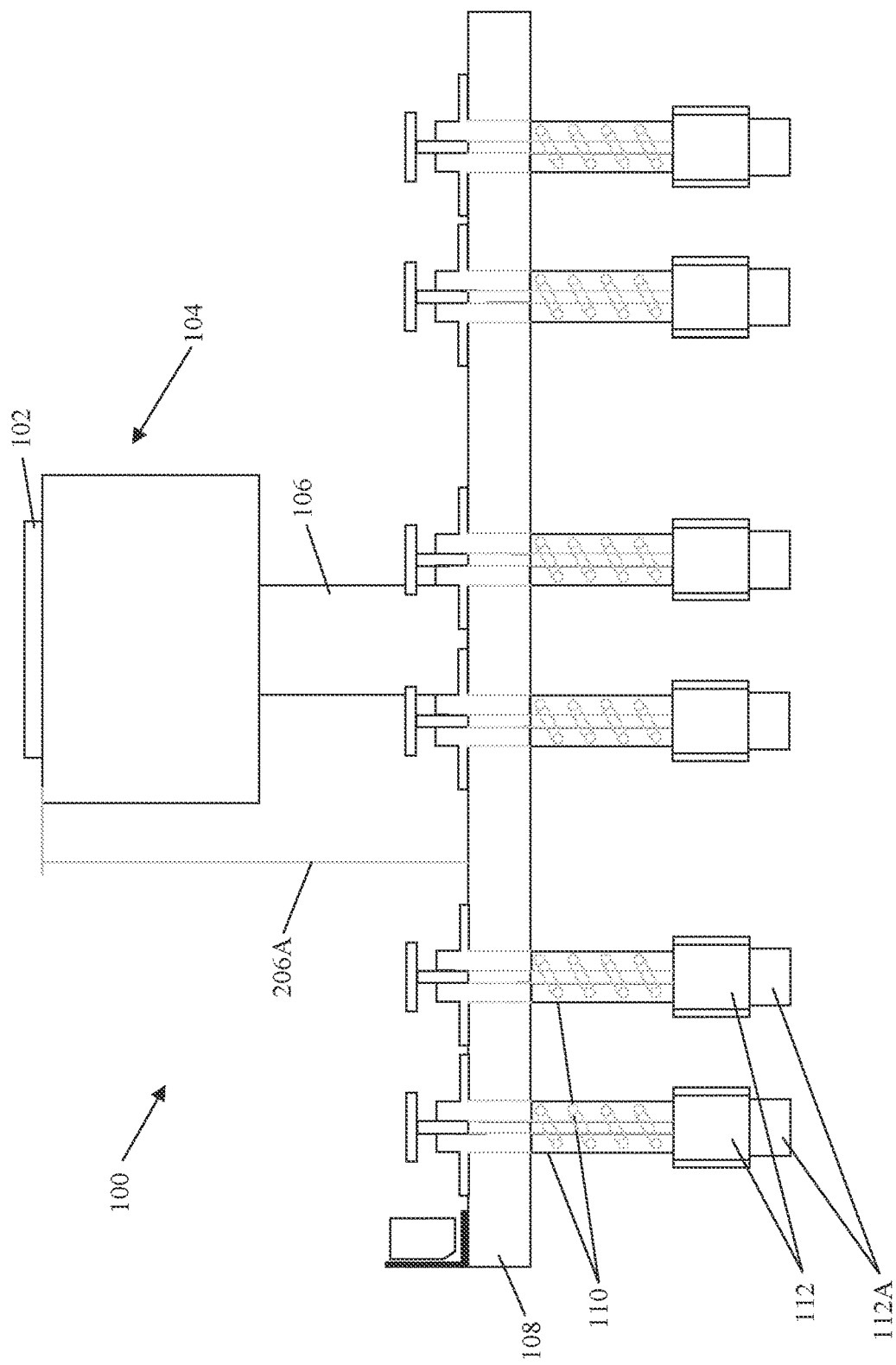
FIGS. 2A-2C are diagrams that collectively illustrate a first exemplary scenario for valve testing of the apparatus of FIG. 1, in accordance with an embodiment of the disclosure.
Figure 2B:
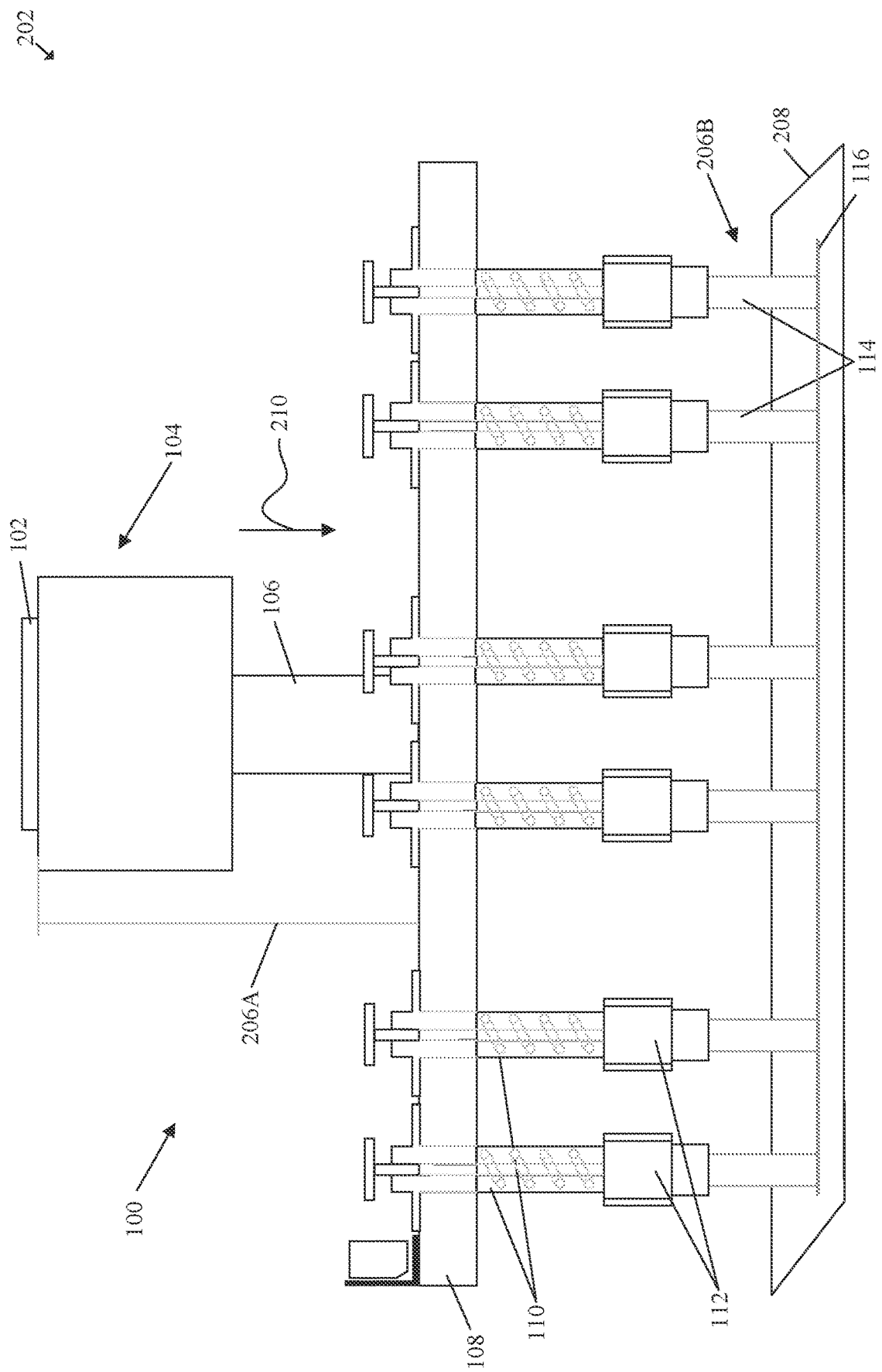
Figure 2C:
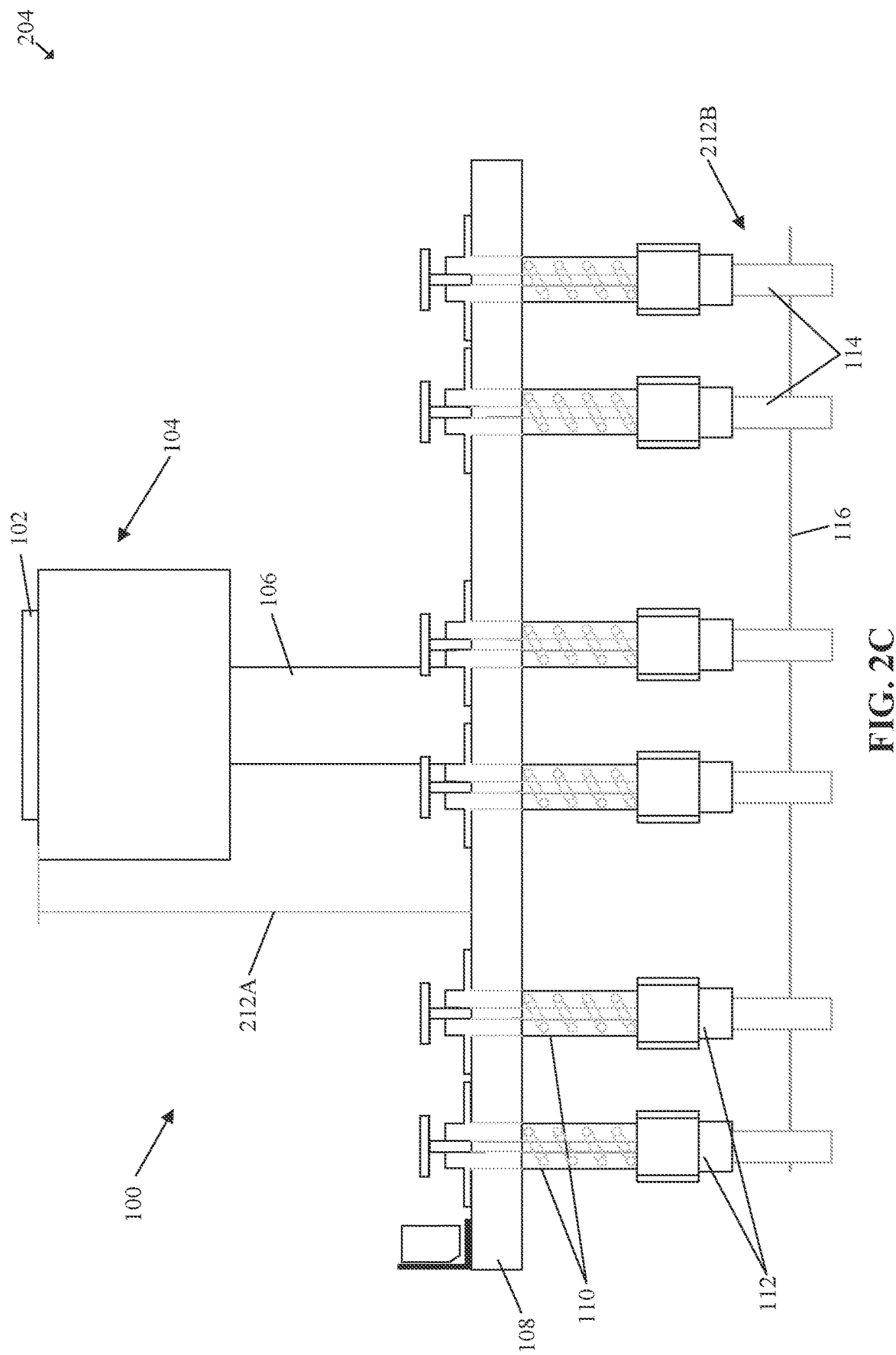
Figure 5:
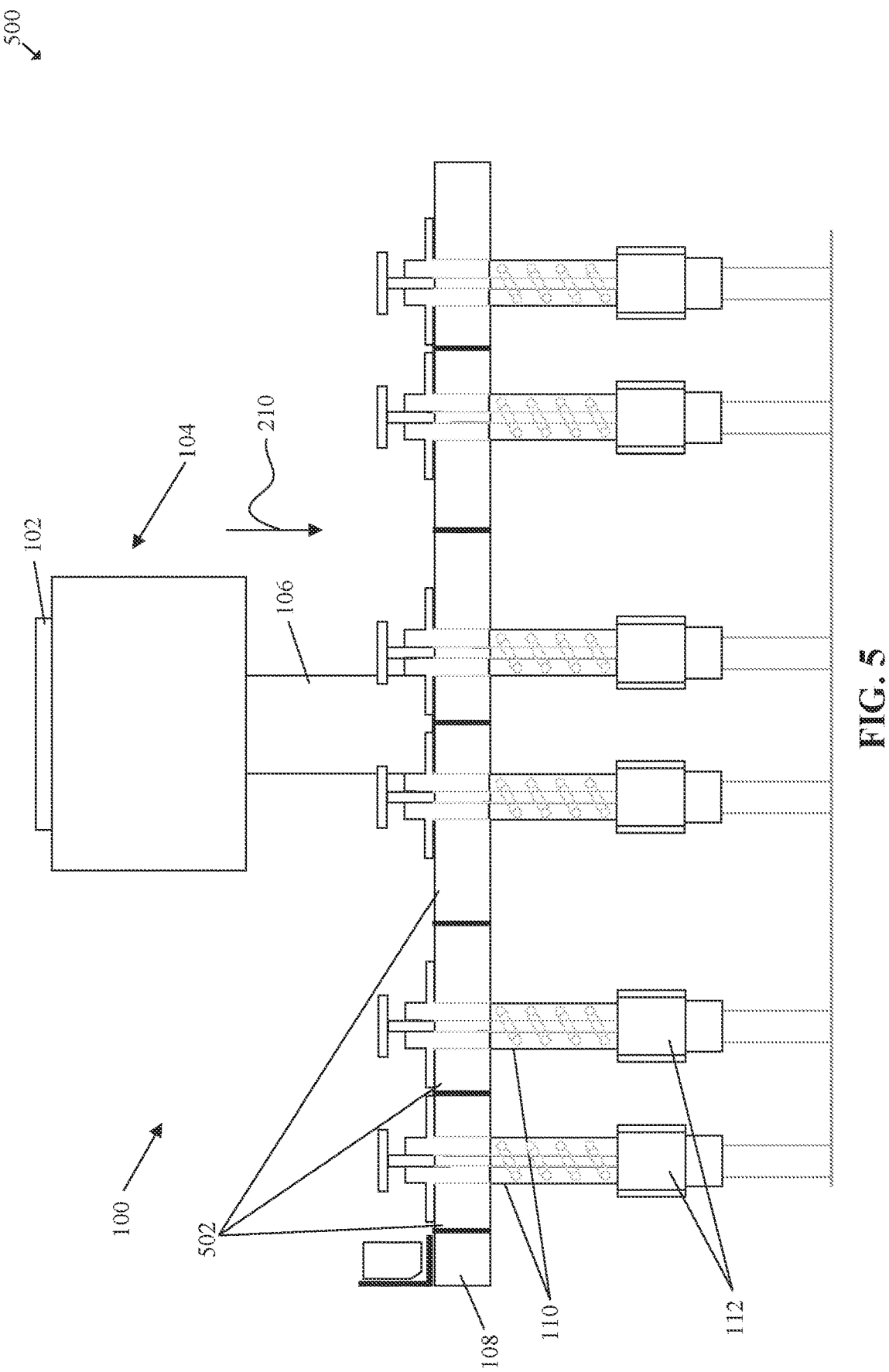
FIG. 5 is a diagram that illustrates a first implementation of a common platform of the apparatus of FIG. 1, in accordance with an embodiment of the disclosure.
Figure 6:
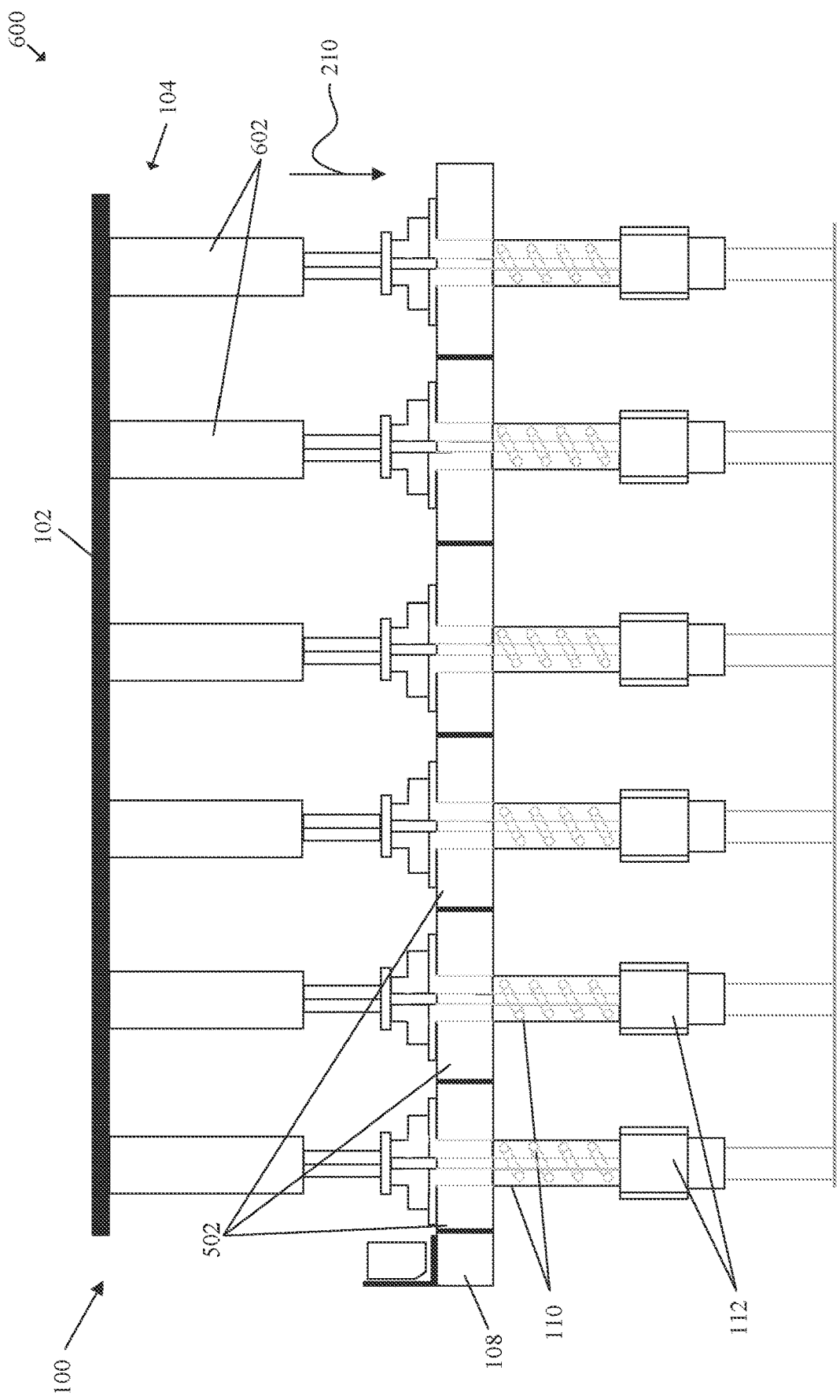
FIG. 6 is a diagram that illustrates a second implementation of a common platform of the apparatus of FIG. 1, in accordance with an embodiment of the disclosure.

In operation, the apparatus 100 may configure each sensor of the plurality of sensors 112 to be coupled with each valve of the valve train 114, via a palette (for example, a jig to align each sensor of the plurality of sensors 112 of the apparatus 100 with each valve of the valve train 114). Based on the engagement, the apparatus 100 may actuate the actuation mechanism 104. When actuated, the actuation mechanism 104 may be configured to control the actuator 106 to move at least a part (for example, a movement of only a section from a plurality of sections of the common platform 108 as shown in FIG. 5 and FIG. 6; or a complete movement of all sections of the common platform 108 as shown in FIG. 2A, FIG. 2B, and FIG. 2C) of the common platform 108 towards a first direction (as shown in FIG. 2A), which may cause at least one member of the plurality of engagement members 110 to move towards the first direction. The movement may facilitate the activation of each valve (such as the valve 114A) of the valve train 114 associated with the engine head 116.

In an embodiment, the activation may correspond to an opening of each valve (such as the valve 114A) of the valve train 114 and a closing of each valve (such as the valve 114A) of the valve train 114. The opening and the closing of each valve of the valve train 114 may complete a cycle of the activation of each valve of the valve train 114. Based on the opening and closing of each valve of the valve train 114, an abnormality (such as an interference between the valves and the ports, or a leakage between the valves and the ports) of each valve of valve train 114 associated with an installation of the valve train 114 may be determined.

In an embodiment, the apparatus 100 may determine the abnormality based on information retrieved from the actuator 106 and the plurality of sensors 112. For example, the apparatus 100 may control each sensor of the plurality of sensors 112 to acquire first information associated with the activation of each valve of the valve train 114, based on the extension of the actuator 106. The first information may correspond to a force value associated with at least one of: a valve bore, a valve stem, a valve seat, a valve spring, or a valve retainer associated with each valve of the valve train. The apparatus 100 may further control the actuation mechanism 104 to acquire second information associated with a position (such as a change in position due to the linear movement) of the actuator 106 from the base 102, based on the extension of the actuator 106. The second information corresponds to a distance determined based on the position of the actuator 106 from the base 102. Based on the received first information and the second information, the apparatus 100 may compare the acquired first information and the second information with pre-stored information respectively, to identify the abnormality (such as the interference between the valves and the ports, or the leakage between the valves and the ports) in each valve (such as the valve 114A)

of the valve train 114, and further generate a notification (such as an alert generated via one of, a speaker, a display unit, a lighting unit, or a vibration motor) based on the comparison. Details of the activation of valves of the valve train 114 are further described, for example, in FIGS. 2A-2C.

FIGS. 2A-2C are diagrams that collectively illustrate a first exemplary scenario for valve testing of the apparatus of FIG. 1, in accordance with an embodiment of the disclosure. FIGS. 2A-2C are explained in conjunction with elements from FIG. 1. With reference to FIG. 2A, there is shown an exemplary scenario 200 for valve testing of the apparatus 100. The valve testing of the apparatus 100 may include a plurality of configurations, such as, but not limited to, an initial configuration 202 (as shown in FIG. 2B) and an activation configuration 204 (as shown in FIG. 2C). Referring to FIG. 2A, there is shown the apparatus 100. During valve testing operation, the apparatus 100 may be configured to be coupled with each valve of the valve train 114 as described, for example, in FIG. 2B.

Referring to FIG. 2B, there is shown the initial configuration 202. In the initial configuration, the actuator 106 of the apparatus 100 may be disposed at an initial length 206A. The initial length 206A may correspond to a length of the actuator 106 from the base 102 to the common platform 108. In the initial configuration 202, the apparatus 100 may be coupled with the valve train 114. In an embodiment, the valve train 114 associated with the engine head 116 may be coupled to a palette 208. The palette 208 may be a jig that may be configured to align each valve (such as the valve 114A) of the valve train 114 with each sensor of the plurality of sensors 112 that may be coupled to corresponding member of the plurality of engagement members 110. For example, the palette 208 may include a plurality of slots that may receive the engine head 116, such that, the received engine head 116 may automatically align each valve of the valve train 114 with corresponding sensor of the plurality of sensors 112 that may be coupled to corresponding member of the plurality of engagement members 110. In an embodiment, at the initial configuration 202, each valve of the valve train 114 may engage at an initial position 206B, with corresponding member of the plurality of engagement members 110.

Referring to FIG. 2C, there is shown the activation configuration 204. In the activation configuration, the actuator 106 of the apparatus 100 may be extended to an extended length 212A. The extended length 212A may correspond to an extended length of the actuator 106 from the base 102 to the common platform 108. In an embodiment, the extension of the actuator 106 may correspond to a difference between the extended length 212A of the actuator 106 and the initial length 206A of the actuator 106. Based on the extension of the actuator 106, the common platform 108 may move with the plurality of engagement members 110, which may subsequently activate the valves of the valve train 114, via the plurality of sensors 112.

In the activation configuration 204, the apparatus 100 may control the actuation mechanism 104 to extend the actuator 106 and move the common platform 108 towards a first direction 210. The first direction 210 may correspond to a downward direction from the base 102 towards the common platform 108. In an embodiment, the movement of the common platform 108 may cause at least one member of the plurality of engagement members 110 to move towards the first direction 210. The movement may facilitate the activation of each valve (such as the valve 114A) of the valve train 114 associated with the engine head 116. Based on such movement, the valves of the valve train 114 may move from the initial position 206B to an activation position 212B.

The activation of valves of the valve train 114 may correspond to an opening of each valve (such as the valve 114A) of the valve train 114 and a closing of each valve (such as the valve 114A) of the valve train 114. The opening and the closing of each valve of the valve train 114 may complete a cycle of the activation of each valve of the valve train 114. Based on the opening and closing of each valve of the valve train 114, an abnormality (such as an interference between the valves and the ports, or a leakage between the valves and the ports) of each valve of valve train 114 associated with an installation of the valve train 114 may be determined.

The apparatus 100 may further determine the abnormality based on information retrieved from the actuator 106 and the plurality of sensors 112. For example, the apparatus 100 may control each sensor of the plurality of sensors 112 to acquire first information associated with the activation of each valve of the valve train 114, based on the extension of the actuator 106. The first information may correspond to a force value associated with at least one of: a valve bore, a valve stem, a valve seat, a valve spring, or a valve retainer associated with each valve of the valve train 114. The apparatus 100 may further control the actuation mechanism 104 to acquire second information associated with a position (such as a change in position due to the linear movement) of the actuator 106 from the base 102, based on the extension of the actuator 106. The second information corresponds to a distance determined based on the position of the actuator 106 from the base 102. Based on the received first information and the second information, the apparatus 100 may compare the acquired first information and the second information with respective pre-stored information, to identify the abnormality (such as the interference between the valves and the ports, or the leakage between the valves and the ports) in each valve (such as the valve 114A) of the valve train 114. The apparatus 100 may further generate the notification based on the comparison. Details of the notification are further described, for example, in FIG. 3.

Figure 3:
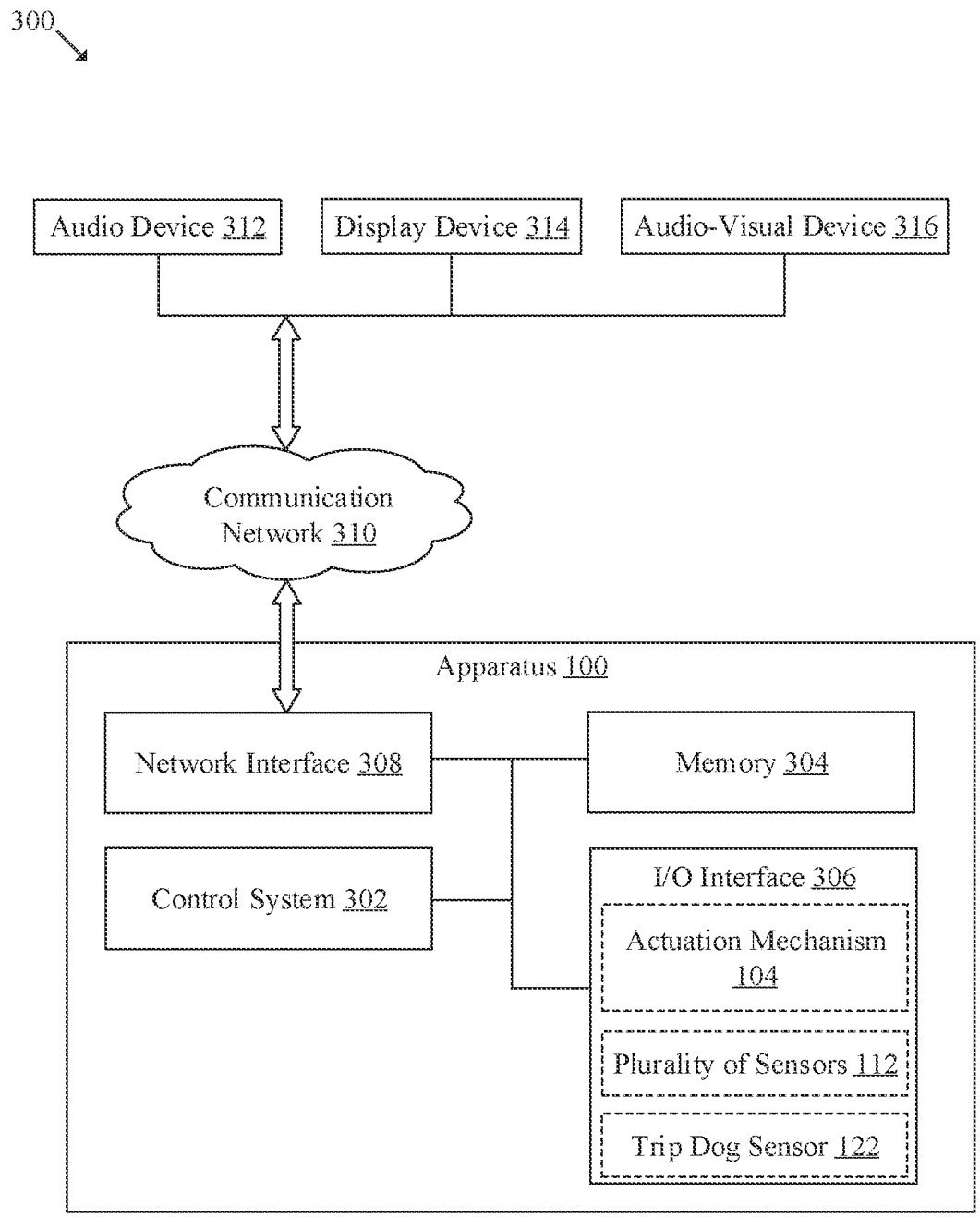
FIG. 3 is a block diagram of the apparatus of FIG. 1, in accordance with an embodiment of the disclosure.

FIG. 3 is a block diagram of the apparatus of FIG. 1, in accordance with an embodiment of the disclosure. FIG. 3 is explained in conjunction with elements from FIG. 1, and FIGS. 2A-2C. With reference to FIG. 3, there is shown a block diagram 300 of the apparatus 100. The apparatus 100 may include a control system 302, a memory 304, a I/O device 306, a network interface 308, and a communication network 310. The apparatus 100 may be remotely couple, via the communication network 310, with one of: an audio device 312, a display device 314, or an audio-visual device 316, to transmit the notification that may be associated with the abnormality in the valves of the valve train 114. In another embodiment, the apparatus 100 may directly include one of: the audio device 312, the display device 314, or the audio-visual device 316 (as a part of I/O device 306), to transmit the notification that may be associated with the abnormality in the valves of the valve train 114.

The control system 302 may include suitable logic, control system, and/or interfaces that may be configured to execute program instructions associated with different operations to be executed by the apparatus 100. For example, some of the operations may include, but are not limited to, an alignment of each sensor of the plurality of sensors 112 with the valves (such as the valve 114A) of the valve train 114 associated with the engine head 116, an activation of the actuation mechanism 104 to control the actuator 106 to move at least the part of the common platform 108 that may cause a movement of at least one of the plurality of engagement members 110 to activate each valve (such as the valve 114A) of the valve train 114 associated with the engine head 116, a control of each sensor of the plurality of sensors 112 to acquire information associated with the activation of each valve of the valve train 114, a comparison of the acquired information with pre-stored information to identify the abnormality in each valve of the valve train 114, and a generation of the notification based on the comparison. The execution of operations is further described, for example, in FIGS. 2A-2C.

The control system 302 may include any suitable special-purpose or general-purpose computer, computing entity, or processing device including various computer hardware or software modules and may be configured to execute instructions stored on any applicable computer-readable storage media (for example, the memory 304). The control system 302 may be implemented based on several processor technologies known in the art. For example, the control system 302 may include a microprocessor, a microcontroller, a digital signal processor (DSP), an application-specific integrated circuit (ASIC), a Field-Programmable Gate Array (FPGA), or any other digital or analog control system configured to interpret and/or to execute program instructions and/or to process data. The control system 302 may include any number of processors that may be configured to, individually or collectively, perform any number of operations of the apparatus 100, as described in the present disclosure. Examples of the control system 302 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 304 may include suitable logic, control system, interfaces, and/or code that may be configured to store the set of instructions executable by the control system 302. In an embodiment, the memory 304 may be configured to store information associated with the alignment of the plurality of engagement members 110, information associated with the control of the actuation mechanism 104, the first information that corresponds to the force value associated with the activation of the valves of the valve train 114 associated with the engine head 116, the second information that corresponds to the distance determined based on the position of the actuator 106 from the base 102, pre-stored information that corresponds to a default force value and a default distance value for the activation of the valves of the valve train 114, and information associated with the notification generated from the apparatus 100 based on the determined abnormality. Examples of implementation of the memory 304 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 306 may include suitable logic, control system, interfaces, and/or code that may be configured to receive inputs (for example, via the actuation mechanism 104) and may render output (for example, via the actuator 106) in response to the received inputs. In an embodiment, the I/O device 306 may be integrally coupled to the apparatus 100 to receive the inputs (for example, directly controlling the apparatus 100, or remotely controlling the apparatus 100 via an operator device, such as a mobile phone) and may render output (for example, via the actuator 106 or the notification device, such as, but not limited to, the audio device 312, the display device 314, or the audio-visual device 316) in response to the received inputs.

In another embodiment, the I/O device 306 may be communicably coupled to the apparatus 100 to receive the inputs and may render output, via the communication network 310. In some embodiments, the I/O device 306 may include the actuation mechanism 104, the plurality of sensors 112, or the trip dog sensor 122. In other embodiment, the I/O device 306 may include various input and output devices that may be configured to communicate with the control system 302. Examples of the such input and output devices may include, but are not limited to, a touch screen, a touch pad, a keyboard, a mouse, a joystick, a microphone, a display device, a speaker, an infotainment system, or an image sensor.

The network interface 308 may include suitable logic, control system, and interfaces that may be configured to facilitate communication between the control system 302 and external devices (such as the audio device 312, the display device 314, or the audio-visual device 316), via the communication network 310. The network interface 308 may be implemented by use of various technologies to support wired or wireless communication of the apparatus 100 with the communication network 310. The network interface 308 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer control system. The network interface 308 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The communication network 310 may include a communication medium through which the apparatus 100 and one of: the audio device 312, the display device 314, or the audio-visual device 316, or the operator device, may communicate with each other. The communication network 310 may be one of a wired connection or a wireless connection. Examples of the communication network 310 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in a network environment of the apparatus 100 may be configured to connect to the communication network 310 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The audio device 312 may include suitable logic, circuitry, and interfaces that may be configured to transmit the notification to an operator, based on the determined abnormality of the valves of the valve train 114. In an embodiment, the audio device 312 may be configured to control playback of an audio output, determined based on the abnormality of the valves of the valve train 114. The audio device 312 may be configured to receive electrical audio signals from the control system 302 and convert the received electrical audio signals into the audio/sound output. In an embodiment, the audio device 312 may be communicably coupled to the apparatus 100, via the communication network 310. In another embodiment, the audio device 312 may be integrally formed in the apparatus 100, as the I/O device 306. Examples of the audio device 312 may include, but are not limited to, a loudspeaker, a woofer, a sub-woofer, a tweeter, a wireless speaker, a wired speaker, a soundcard, a headphone, or other speakers or sound output device.

The display device 314 may include suitable logic, circuitry, and interfaces that may be configured to display the notification (such as an installation/abnormality status of the valves of the valve train 114) to the operator, based on the determined abnormality of the valves of the valve train 114. The display device 314 may be a touch screen, which may enable a user to provide a user-input via the display device 314. The touch screen may be at least one of a resistive touch screen, a capacitive touch screen, or a thermal touch screen. In an embodiment, the display device 314 may be communicably coupled to the apparatus 100, via the communication network 310. In another embodiment, the display device 314 may be integrally formed in the apparatus 100, as the I/O device 306. Examples of the display device 314 may include, but are not limited to, at least one of: a liquid crystal display (LCD) display, a Light Emitting Diode (LED) display, a plasma display, or an Organic LED (OLED) display technology, or other display devices. In accordance with an embodiment, the display device 314 may refer to a display screen of a head-mounted device (HMD), a smart-glass device, a see-through display, a projection-based display, an electro-chromic display, or a transparent display.

The audio-visual device 316 may be a combination of audio and visual systems that may be configured to transmit the notification to the operator, based on the determined abnormality of the valves of the valve train 114. For example, the audio-visual device 316 may be a combination of the audio device 312 and the display device 314. In an embodiment, the audio-visual device 316 may be a human machine interface (HMI) in the assembly line, which may be configured to transmit the notification to the operator, via a display unit (such as the display device 314) and an integral audio device (such as the audio device 312) of the display unit.

In operations, the control system 302 may control the actuation mechanism 104 to actuate the actuator 106 that retractably extends from the base 102, which may cause the movement of the common platform 108 from the base 102. Based on the activation of the valves of the valve train 114, the control system 302 may further control each sensor of the plurality of sensors 112 to acquire information (such as the first information) associated with the activation of each valve of the valve train 114. Based on the acquisition of the information from the plurality of sensors 112, the control system 302 may compare the acquired information with the pre-stored information (such as the default force value for the activation of the valves of the valve train 114), to identify the abnormality in each valve of the valve train 114. Based on the determined abnormality, the control system may generate the notification.

In another embodiment, the control system 302 may control each sensor of the plurality of sensors 112 to acquire the first information (such as information associated with the force value) associated with the activation of each valve of the valve train 114, based on the extension of the actuator 106. For example, the first information may correspond to the force value associated with at least one of: a valve bore, a valve stem, a valve seat, a valve spring, or a valve retainer associated with each valve of the valve train 114. The control system 302 may further control the actuation mechanism 104 to acquire the second information associated with the position of the actuator 106 from the base 102, based on the extension of the actuator 106. For example, the second information may correspond to the distance determined based on the position of the actuator 106 from the base 102.

Based on the acquisition of the first information and the second information, the control system 302 may compare the acquired first information with first pre-stored information (such as the default force value for the activation of the valves of the valve train 114) and further compare the acquired second information with second pre-stored information (such as the default distance value for the activation of the valves of the valve train 114). The control system 302 may further identify the abnormality in each valve of the valve train 114 based on the comparison. For example, in case a force value indicated by the acquired first information is higher than the default force value indicated by the first pre-stored information and/or in case a distance value indicated by the acquired second information is higher than the default distance value indicated by the second pre-stored information, then the abnormality in each valve (or particular valve) of the valve train 114 may be identified or detected. In some embodiments, the control system 302 may compare waveforms associated with the first pre-stored information and the second pre-stored information with respective waveforms associated with the acquired first information and with the second information, and further identify the abnormality based on the comparisons.

Based on the determined abnormality, the control system 302 may further generate the notification based on the comparison. The notification (or alerts) may include at least one of: an audible notification (such as via the audio device 312), a visual notification (such as via the display device 314 or the audio-visual device 316), or a vibratory notification (such as via a vibration motor associated with the apparatus 100. The generated notification may indicate the determined abnormality in the valve train 114 to the operator.

Figure 4A:
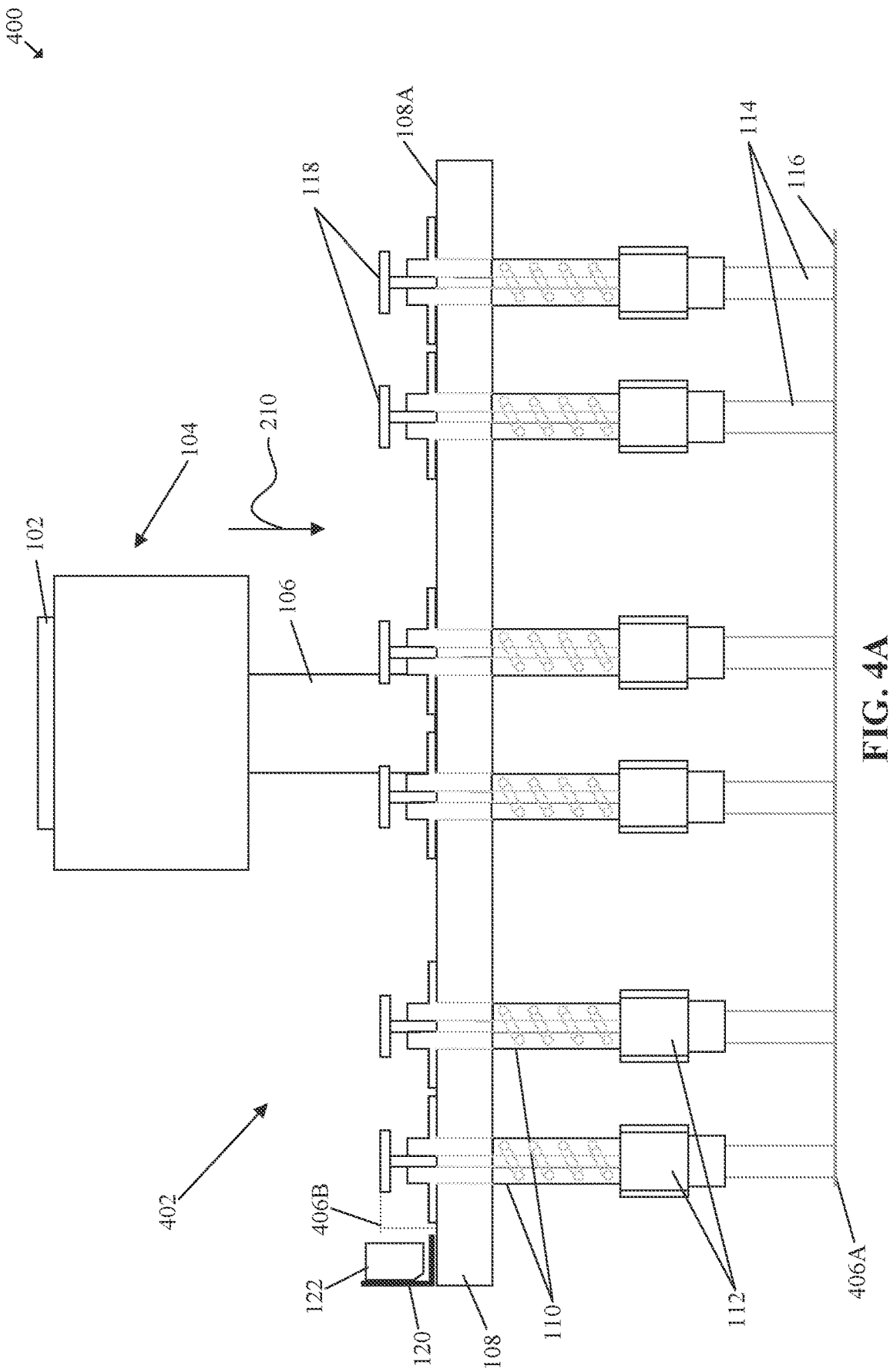
FIGS. 4A-4B are diagrams that collectively illustrate a second exemplary scenario for valve testing of the apparatus of FIG. 1, in accordance with an embodiment of the disclosure.
Figure 4B:
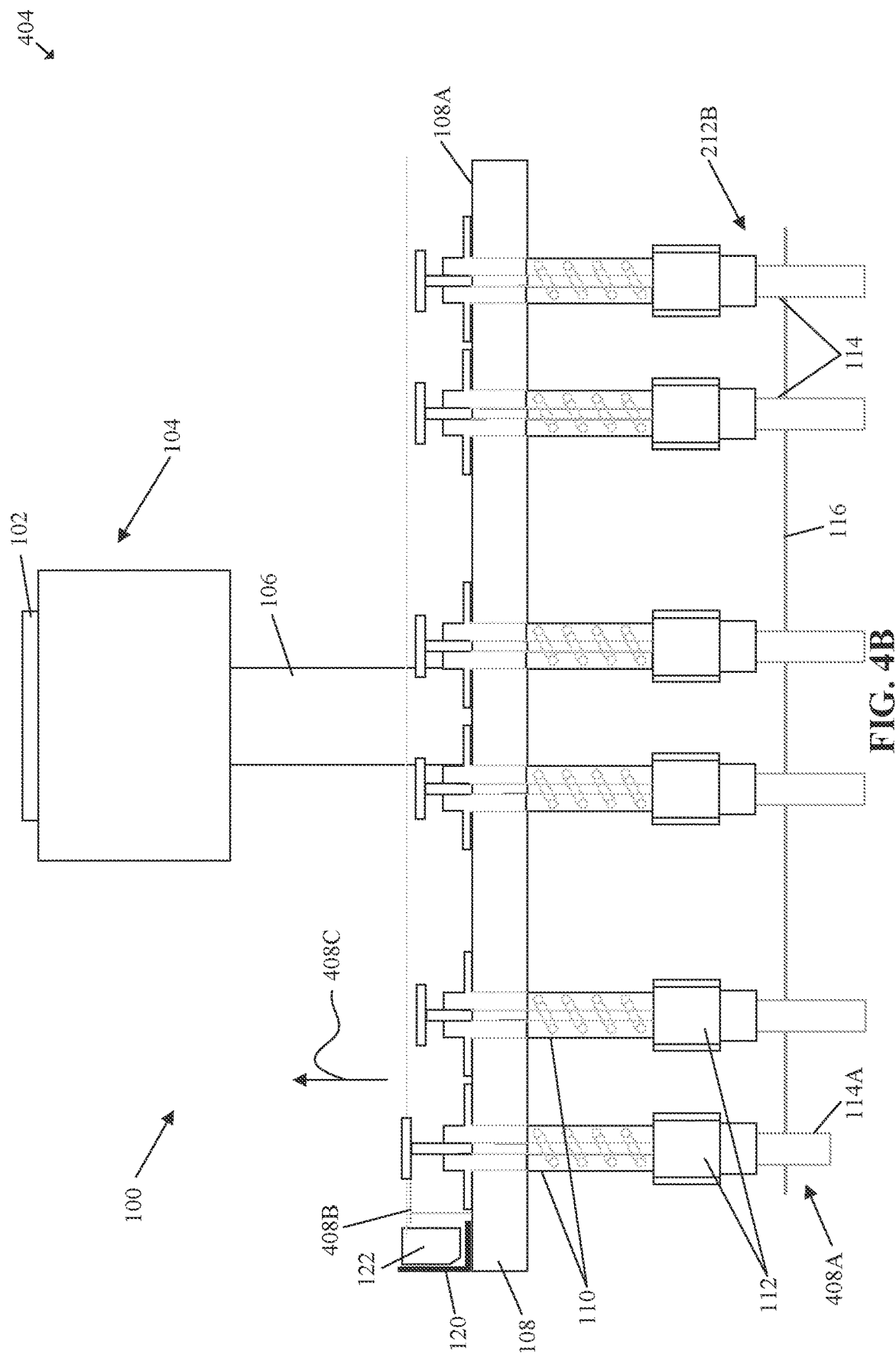

In another embodiment, the control system 302 may further control the trip dog sensor 122 (shown in FIG. 1) to acquire information associated with the extension of the trip dog from the plurality of trip dogs 118 in a second direction 408C (as shown in FIG. 4B). Based on the acquisition of the information from the trip dog sensor 122, the control system 302 may compare the acquired information with pre-stored information (such as information that corresponds to a default extension value of each of the plurality of trip dogs 118 in the second direction 408C), to identify a status (such as the interruption in the activation of the valves of the valve train 114, or a success in the activation of the valves of the valve train 114) associated with the interruption in the extension of the actuator 106 while performing the activation of each valve of the valve train 114. Based on the comparison, the control system 302 generate a control signal for the actuation mechanism 104 to control the actuator 106. Details of the interruption in the activation of the valves of the valve train 114 are further described, for example, in FIGS. 4A-4B.

FIGS. 4A-4B are diagrams that collectively illustrate a second exemplary scenario for valve testing of the apparatus of FIG. 1, in accordance with an embodiment of the disclosure. FIGS. 4A-4B are explained in conjunction with elements from FIG. 1, FIGS. 2A-2C, and FIG. 3. With reference to FIG. 4A, there is shown an exemplary scenario 400 for valve testing of the apparatus 100. The valve testing of the apparatus 100 may include a plurality of configurations, such as, but not limited to, an initial configuration 402 (as shown in FIG. 4A) and an interruption configuration 404 (as shown in FIG. 4B).

Referring to FIG. 4A, there is shown the initial configuration 402. In the initial configuration 402, the valves of the valve train 114 may be disposed at an initial position 406A. The initial position 406A may correspond to a default position of each valve (such as the valve 114A) of the valve train 114). Based on the movement of the common platform 108 towards the first direction 210, each member of the plurality of engagement members 110 may towards the first direction 210 to activate corresponding valve of the valve train 114.

In certain cases, all members of the plurality of engagement members 110 may perform the opening and the closing of all valves of the valve train 114 and successfully completes the cycle of the activation of all valves of the valve train 114. In an embodiment, each trip dog of the plurality of trip dogs 118 (that corresponds to the successfully activated valve) may be positioned at an initial length 406B. The initial length 406B may correspond to a default length of each trip dog of the plurality of trip dogs 118, which may be measured from the first surface 108A of the common platform 108. However, in certain situations (such as a presence of an abnormal valve in the valve train), there may be interruptions in the activation of the valves of the valve train 114. Details of such interruptions are further described, for example, in FIG. 4B.

Referring to FIG. 4B, there is shown the interruption configuration 404. In the interruption configuration 404, even after the movement of the common platform 108 along the first direction 210 (shown in FIG. 4A), at least one member of the plurality of engagement members 110 may fail to activate the valves of the valve train 114. During such attempt of the activation, at least one member of the plurality of engagement members 110 may move towards the first direction 210 from the initial position 406A (shown in FIG. 4A) to an interrupted position 408A (shown in FIG. 4B). At the interrupted position 408A, the corresponding valve (such as the valve 114A) of the valve train 114 may be stuck and trigger corresponding trip dog of the plurality of trip dogs 118 to move from the initial length 406B (shown in FIG. 4A) to an interrupted length 408B (shown in FIG. 4B). The corresponding trip dog of the plurality of trip dogs 118 may move to the interrupted length 408B in a second direction 408C. The second direction 408C may correspond to a direction of the movement of the corresponding trip dog from the first surface 108A of the common platform 108 towards the base 102. In an embodiment, based on the interruption in the extension of the actuator 106 (while performing the activation of particular valve of the valve train 114), the corresponding trip dog of the plurality of trip dogs 118 may be configured to extend in the second direction 408C. In another embodiment, the interrupted length 408B of the corresponding trip dog along the second direction 408C may be substantially proportional to the interruption in corresponding valve of the valve train 114 that may fail to activate in the engine head 116.

In an embodiment, the apparatus 100 may further control the trip dog sensor 122 to acquire information associated with the extension of the corresponding trip dog from the plurality of trip dogs 118 in the second direction 408C. Based on the acquisition of the information from the trip dog sensor 122, the apparatus 100 may compare the acquired information with the pre-stored information (such as information that corresponds to the default extension value of each of the plurality of trip dogs 118 in the second direction 408C), to identify a status (such as the interruption in the activation of the valves of the valve train 114, or a success in the activation of the valves of the valve train 114) associated with the interruption in the extension of the actuator 106 while performing the activation of each valve of the valve train 114. The apparatus 100 may further generate the control signal for the actuation mechanism 104 to control the actuator 106 based on the comparison. In another embodiment, the apparatus 100 may further generate the notification (such as an alert that may be generated via one of, a speaker, a display unit, a lighting unit, or a vibration motor) based on the comparison.

FIG. 5 is a diagram that illustrates a first implementation of a common platform of the apparatus of FIG. 1, in accordance with an embodiment of the disclosure. FIG. 5 is explained in conjunction with elements from FIGS. 1, 2A-2C, 3, and 4A-4B. With reference to FIG. 5, there is shown a first implementation 500 of the common platform 108 of the apparatus 100. In the first implementation 500, the common platform 108 may include a plurality of sub-platforms 502 that may be configured to be selectively moved via the actuator 106 from the base 102 towards the first direction 210, further to selectively move each member of the plurality of engagement members 110 and activate corresponding valve of the valve train 114 based on an operator preference. The operator preference may relate to a selective re-activation of one or more abnormal valves of the valve train 114 based on the detected abnormality, to further troubleshoot a fault in such one or more abnormal valves (such as by a visual inspection of a part of such abnormal valve that causes an interference or leakage when assembled in corresponding valve guide of the engine head 116). For example, the actuator 106 may be coupled with the plurality of sub-platforms 502 via a gearing arrangement (not shown) that may be configured to selectively move each sub-platform of the plurality of sub-platforms 502 based on the operator preference. Therefore, the operator may selectively customize his/her preference of the activation of each valve of the valve train 114 to individually recheck on the abnormality in each valve of the valve train 114, based on the first implementation 500 of the common platform 108.

FIG. 6 is a diagram that illustrates a second implementation of a common platform of the apparatus of FIG. 1, in accordance with an embodiment of the disclosure. FIG. 6 is explained in conjunction with elements from FIGS. 1, 2A-2C, 3, 4A-4B, and 5. With reference to FIG. 6, there is shown a second implementation 600 of the common platform 108 of the apparatus 100. In the second implementation 600, the common platform 108 may include the plurality of sub-platforms 502 that may be independently coupled with a plurality of actuators 602, such that, each sub-platform of the plurality of sub-platforms 502 may be coupled with corresponding actuator of the plurality of actuators 602 (as shown, for example, in FIG. 6). In an embodiment, each actuator of the plurality of actuators 602 may be configured to selectively move corresponding sub-platform of the plurality of sub-platforms 502, from the base 102 towards the first direction 210 to selectively move each member of the plurality of engagement members 110 and activate corresponding valve of the valve train 114 based on the operator preference. For example, each actuator of the plurality of actuators 602 may be coupled with corresponding sub-platform of the plurality of sub-platforms 502 via a gearing arrangement (not shown), such that, each actuator of the plurality of actuators 602 may independently control the movement of the corresponding sub-platform of the plurality of sub-platforms 502, based on the operator preference. Therefore, the operator may selectively customize his/her preference of the activation of each valve of the valve train 114 to individually recheck on the abnormality in each valve of the valve train 114, based on the second implementation 600 of the common platform 108.

Figure 7:
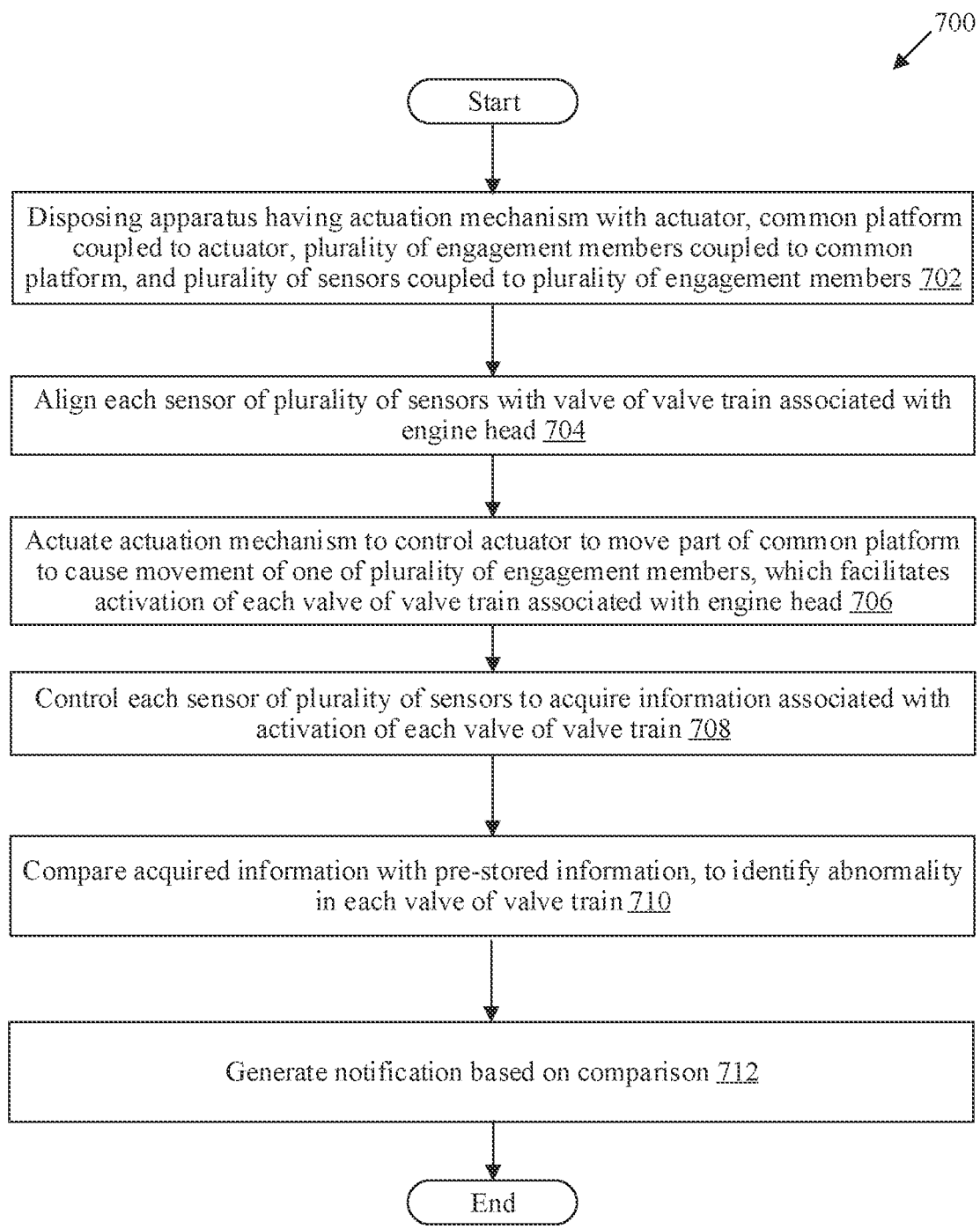
FIG. 7 is a flowchart that illustrates an exemplary method for testing valves via the apparatus of FIG. 1, in accordance with an embodiment of the disclosure.

FIG. 7 is a flowchart that illustrates an exemplary method for testing valves via the apparatus of FIG. 1, in accordance with an embodiment of the disclosure. FIG. 7 is explained in conjunction with elements from FIGS. 1, 2A-2C, 3, 4A-4B, 5 and 6. With reference to FIG. 7, there is shown a flowchart 700 that depicts for testing each valve of the valve train 114, via the apparatus 100 or the control system 302. The method illustrated in the flowchart 700 may start from 702.

At 702, the apparatus 100 may be disposed (such as on a floor, like the assembly line). The apparatus 100 may include the actuation mechanism 104 that includes the actuator 106, the common platform 108 coupled to the actuator 106, the plurality of engagement members 110 coupled to the common platform 108, and the plurality of sensors 112 coupled to the plurality of engagement members 110, as described, for example, in FIG. 1

At 704, each sensor of plurality of sensors 112 may be aligned with the valve (such as the valve 114A) of the valve train 114 associated with the engine head 116. In an embodiment, the apparatus 100 or the control system 302 (or the operator) may align each sensor of plurality of sensors 112 with the corresponding valve (such as the valve 114A) of the valve train 114 associated with the engine head 116, as described (for example) in FIGS. 1, 2A-2C, and 3.

At 706, the actuation mechanism 104 may be actuated to control the actuator 106 to move the part of the common platform 108 to further cause the movement of one of the plurality of engagement members 110, which may facilitate the activation of each valve of the valve train 114 associated with the engine head 116. In an embodiment, the apparatus 100 or the control system 302 may actuate the actuation mechanism 104 to control the actuator 106 to move the part of common platform 108 to further cause the movement of one of the plurality of engagement members 110 as described, for example, in FIGS. 1, 2A-2C, and 3.

At 708, each sensor of plurality of sensors 112 may be controlled to acquire information (such as the first information and the second information) associated with the activation of each valve of valve train 114. In an embodiment, the apparatus 100 or the control system 302 may control each sensor of plurality of sensors 112 to acquire information (such as the first information and the second information) associated with the activation of each valve of valve train 114 as described, for example, in FIGS. 1, 2A-2C, and 3.

At 710, the acquired information may be compared with the pre-stored information, to identify the abnormality in each valve of valve train 114. In an embodiment, the apparatus 100 or the control system 302 may be configured to compare the acquired information with the pre-stored information, to identify the abnormality in each valve of valve train 114 as described, for example, in FIGS. 1, 2A-2C, and 3.

At 712, the notification may be generated based on the comparison. In an embodiment, the apparatus 100 or the control system may generate the notification (alert) based on the comparison as described, for example, in FIGS. 1, 2A-2C, and 3. Control may pass to end.

The flowchart 700 is illustrated as discrete operations, such as 702, 704, 706, 708, 710, and 712. However, in certain embodiments, such discrete operations may be further divided into additional operations, combined into fewer operations, or eliminated, or rearranged depending on the implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (for example the apparatus 100) for valve testing. The set of instructions may be executable by the machine and/or the computer (for example, the apparatus 10 or the control system 302) to perform operations that may include, but are not limited to, aligning each sensor of the plurality of sensors 112 with a valve of a valve train 114 associated with an engine head 116, actuating the actuation mechanism 104 to control the actuator 106 to move at least a part of the common platform 108, which further causes a movement of at least one of the plurality of engagement members 110, controlling each sensor of the plurality of sensors 112 to acquire information associated with the activation of each valve of the valve train 114, comparing the acquired information with pre-stored information, to identify an abnormality in each valve of the valve train 114, and generating a notification based on the comparison.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a situation or material to the teachings of the present disclosure without departing from its scope. Therefore, it is intended that the present disclosure not be limited to the embodiment disclosed, but that the present disclosure will include all embodiments that fall within the scope of the appended claims.

What is claimed is:

1. An apparatus, comprising:
   a base;
   an actuation mechanism which comprises an actuator having a first end and a second end, wherein the first end is coupled to the base and the second end is configured to retractably extend from the base;
   a common platform which comprises a first surface and a second surface, wherein the first surface is coupled to the second end of the actuator and configured to move from the base, based on an extension of the actuator;
   a plurality of engagement members each of which comprises a first portion and a second portion, wherein the first portion of each of the plurality of engagement members is coupled to the first surface of the common platform and the second portion of each of the plurality of engagement members is coupled to the second surface of the common platform; and
   a plurality of sensors coupled to the plurality of engagement members such that each sensor of the plurality of sensors is coupled to corresponding member of the plurality of engagement members, wherein each sensor of the plurality of sensors is configured to be coupled with a valve of a valve train.

2. The apparatus according to claim 1, when actuated, the actuation mechanism is configured to control the actuator to move at least a part of the common platform towards a first direction, which causes at least one of the plurality of engagement members to move towards the first direction, wherein the movement facilitates an activation of each valve of the valve train.

3. The apparatus according to claim 2, wherein the activation corresponds to an opening of each valve of the valve train and a closing of each valve of the valve train, and wherein the opening and the closing of each valve of the valve train completes a cycle of the activation of each valve of the valve train.

4. The apparatus according to claim 1, further comprising a control system that is configured to:
   control each sensor of the plurality of sensors to acquire information associated with an activation of each valve of the valve train, based on the extension of the actuator;
   compare the acquired information with pre-stored information, to identify an abnormality in each valve of the valve train; and
   generate a notification based on the comparison.

5. The apparatus according to claim 1, further comprising a control system that is configured to:
   control each sensor of the plurality of sensors to acquire first information associated with an activation of each valve of the valve train, based on the extension of the actuator;
   control the actuation mechanism to acquire second information associated with a position of the actuator from the base, based on the extension of the actuator;
   compare the acquired first information and the second information with pre-stored information, to identify an abnormality in each valve of the valve train; and
   generate a notification based on the comparison.

6. The apparatus according to claim 5, wherein the control system is further configured to compare a waveform associated with the pre-stored information with a waveform associated with the acquired first information and the second information, and identify the abnormality based on the comparison.

7. The apparatus according to claim 5, wherein the first information corresponds to a force value associated with at least one of: a valve bore, a valve stem, a valve seat, a valve spring, or a valve retainer associated with each valve of the valve train, and wherein the second information corresponds to a distance determined based on the position of the actuator from the base.

8. The apparatus according to claim 5, wherein the notification comprises at least one of: an audible notification, a visual notification, or a vibratory notification.

9. The apparatus according to claim 1, further comprising a control system that is configured to control the actuation mechanism to actuate the actuator that retractably extends from the base, which causes a movement of the common platform from the base.

10. The apparatus according to claim 1, wherein the plurality of engagement members comprises a plurality of trip dogs, wherein each trip dog of the plurality of trip dogs is configured to retractably extend in a second direction, such that, corresponding trip dog moves from the first surface of the common platform towards the base, and
   wherein, based on an interruption in the extension of the actuator that causes an activation of each valve of the valve train, the corresponding trip dog is configured to extend in the second direction.

11. The apparatus according to claim 10, wherein each trip dog of the plurality of trip dogs is further configured to be concentrically disposed in corresponding member of the plurality of engagement members, and wherein each trip dog of the plurality of trip dogs is biased by a heavy spring that is disposed inside each member of the plurality of engagement members.

12. The apparatus according to claim 10, wherein the common platform further comprises a support structure and a trip dog sensor coupled to the support structure, the support structure is disposed at a portion of the first surface of the common platform, and wherein the trip dog sensor is configured to detect an extension of each trip dog in the second direction.

13. The apparatus according to claim 12, further comprising a control system that is configured to:
control the trip dog sensor to acquire information associated with the extension of the trip dog in the second direction;
compare the acquired information with pre-stored information, to identify a status associated with the interruption in the extension of the actuator that causes the activation of each valve of the valve train; and
generate a control signal for the actuation mechanism to control the actuator based on the comparison.

14. The apparatus according to claim 1, wherein the common platform has a plurality of sub-platforms, and wherein each sub-platform of the plurality of sub-platforms is configured to selectively move from the base, based on an extension of the actuator.

15. The apparatus according to claim 1, wherein the common platform has a plurality of sub-platforms, wherein each sub-platform of the plurality of sub-platforms is configured to be coupled with a plurality of actuators of the actuation mechanism, and wherein each sub-platform is configured to selectively move from the base, based on an extension of corresponding actuator of the plurality of actuators.

16. The apparatus according to claim 1, wherein the common platform is configured to be disposed substantially perpendicular to the actuator, and wherein the plurality of engagement members are disposed substantially perpendicular to the common platform.

17. The apparatus according to claim 1, wherein the actuator comprises one of: an electric actuator, a hydraulic actuator, or a pneumatic actuator.

18. The apparatus according to claim 1, wherein the valve train is coupled to a palette associated with the apparatus, and wherein the palette is configured to align each valve of the valve train with each sensor of the plurality of sensors that is coupled to corresponding member of the plurality of engagement members.

19. An apparatus, comprising:
an actuation mechanism which comprises an actuator;
a common platform coupled to the actuator;
a plurality of engagement members coupled to the common platform; and
a plurality of sensors coupled to the plurality of engagement members such that each sensor of the plurality of sensors is coupled to corresponding member of the plurality of engagement members and aligned with a valve of a plurality of valves associated with a machine; and
a control system coupled to the plurality of sensors, wherein the control system is configured to:
actuate the actuation mechanism to control the actuator to move at least a part of the common platform, which causes a movement of at least one of the plurality of engagement members, wherein the movement facilitates an activation of each valve of the plurality of valves,
control each sensor of the plurality of sensors to acquire information associated with the activation of each valve of the plurality of valves,
compare the acquired information with pre-stored information, to identify an abnormality in each valve of the plurality of valves, and
generate a notification based on the comparison.

20. A method, comprising:
disposing an apparatus which comprises:
an actuation mechanism which comprises an actuator,
a common platform coupled to the actuator,
a plurality of engagement members coupled to the common platform, and
a plurality of sensors coupled to the plurality of engagement members such that each sensor of the plurality of sensors is coupled to corresponding member of the plurality of engagement members;
aligning each sensor of the plurality of sensors with a valve of a plurality of valves associated with a machine;
actuating the actuation mechanism to control the actuator to move at least a part of the common platform, which causes a movement of at least one of the plurality of engagement members, wherein the movement facilitates an activation of each valve of the plurality of valves;
controlling each sensor of the plurality of sensors to acquire information associated with the activation of each valve of the plurality of valves;
comparing the acquired information with pre-stored information, to identify an abnormality in each valve of the plurality of valves; and
generating a notification based on the comparison.

* * * * *